(12) United States Patent
Murfett et al.

(10) Patent No.: US 7,840,734 B2
(45) Date of Patent: Nov. 23, 2010

(54) SIMPLE BUS BUFFER

(75) Inventors: David Murfett, Hendon (AU); Paul Bourne, Hendon (AU); Philip Tracy, Hendon (AU)

(73) Assignee: Hendon Semiconductors Pty Ltd. (AU)

( * ) Notice: Subject to any disclaimer, the term of this patent is extended or adjusted under 35 U.S.C. 154(b) by 0 days.

(21) Appl. No.: 11/960,152

(22) Filed: Dec. 19, 2007

(65) Prior Publication Data

US 2008/0183919 A1 Jul. 31, 2008

(30) Foreign Application Priority Data

Dec. 21, 2006 (AU) .............................. 2006907127

(51) Int. Cl.
*G06F 13/00* (2006.01)
(52) U.S. Cl. ........................ 710/106; 326/86; 326/90; 326/93; 710/110
(58) Field of Classification Search ............... 710/100, 710/106, 110, 305; 326/86, 90, 93
See application file for complete search history.

(56) References Cited

U.S. PATENT DOCUMENTS

| | | |
|---|---|---|
| 4,012,593 A | 3/1977 | Yamaguchi |
| 4,726,034 A | 2/1988 | Schillhof et al. |
| 5,418,933 A | 5/1995 | Kimura et al. |
| 5,428,800 A | 6/1995 | Hsieh et al. |
| 5,689,196 A | 11/1997 | Schutte |
| 5,790,526 A | 8/1998 | Kniess et al. |
| 5,867,672 A | 2/1999 | Wang et al. |
| 5,982,674 A | 11/1999 | Lines et al. |
| 6,014,040 A | 1/2000 | Tracy |
| 6,055,597 A | 4/2000 | Houg |
| 6,212,224 B1 | 4/2001 | Cammarota et al. |
| 6,467,010 B1 | 10/2002 | Pontius et al. |
| 6,650,174 B2 | 11/2003 | Bell |
| 6,714,051 B2 | 3/2004 | Takiba et al. |
| 6,834,318 B2 | 12/2004 | Hunter et al. |
| 7,417,464 B2 * | 8/2008 | Crawford ..................... 326/89 |
| 2003/0043300 A1 | 3/2003 | White |
| 2003/0191809 A1 | 10/2003 | Mosley et al. |
| 2005/0165989 A1 | 7/2005 | Kim |
| 2006/0290381 A1 * | 12/2006 | Bui et al. ..................... 326/91 |

FOREIGN PATENT DOCUMENTS

| | | |
|---|---|---|
| EP | 0 511 706 A2 | 11/1992 |
| EP | 1 213 655 A2 | 6/2002 |

\* cited by examiner

*Primary Examiner*—Glenn A Auve
(74) *Attorney, Agent, or Firm*—Akerman Senterfitt

(57) ABSTRACT

A bus buffer can include a data buffer and a clock signal buffer. The data buffer for can include two symmetrical buffer circuits with an output signal that can follow the input voltage to provide bi-directional buffer action for a data path of the bus buffer. The clock buffer can operate in a forward or reverse direction, where the signal direction for the clock signal path in the bus buffer can be controlled with a direction input. The bus buffer can also include an enable circuit for enabling the data path and the clock signal path.

7 Claims, 5 Drawing Sheets

SIMPLE BUS BUFFER

TECHNICAL FIELD

This invention relates to a buffer for a bi-directional signal transmission system by which a digital signal can be transmitted in both directions.

BACKGROUND ART

A number of two wire bi-directional signal transmission systems have been extensively used. One such system is the Inter Integrated Circuit Bus system (I2C Bus system), disclosed in the Philips Data Handbook IC12a, 1989, and "The I2C Bus and how to use it (including specifications)" 1995 Philips Semiconductors.

The I2C Bus system is a serial bus system between individual integrated circuits, or stations, that are interconnected through a bi-directional two wire transmission channel. Of the two wires, one carries a clock signal, and the other the data, with a predetermined communication protocol. Depending on the particular function within the system, an individual station can act as the transmitter, or as a receiver. In many cases the full bi-directional capability is not used, and presents unnecessary complexity to fully meet all aspects of the I2C system standards, even when these features are not used or needed in many specific applications.

The I2C system uses a data wire (SDA) and clock wire (SCL) which are connected to a positive supply ($V_{CC}$) through pull-up resistors. When the stations are not communicating the clock and data lines are free, and pulled high by these resistors. Each station which can communicate on the bus has an open collector or open drain output which can pull the bus lines to a low voltage level close to the negative supply ($V_{EE}$). The sequence in which the SCL and SDA lines are pulled low provides the communication information flow between the integrated circuits sharing that bus.

The number of stations allowed, or the distance over which the bus can communicate is determined by the load presented on the bus line by the total capacitance of each line. That is by the total of the capacitance of the bus wiring, the connections, the integrated circuit pins, and the capacitive load presented by each input/output circuit within the integrated circuit. If the bus capacitance is increased then the maximum possible speed of the bus is limited, and the slower rise times on the bus start to cause difficulties.

The I2C Bus was designed to allow communication of data between integrated circuits on a single assembled printed circuit board in a manner which does not require a wide communication bus or individual address lines between ICs in order to achieve that communication. However designers quickly became aware that the advantages offered by I2C interconnection between circuits within a single board assembly, would also be available if the bus could be used to communicate over greater distances. In other applications, as the complexity of the system increased, many examples were found which required more than the maximum number of integrated circuits permitted by the specification to share the bus.

For example, in a digital voltmeter, the communication between the parts of the circuit performing range switching, the measuring circuit, the controller, the measurement memory, and the display drive was traditionally designed with multiple wire parallel buses between each integrated circuit used to construct the meter. This presents a challenge to design an efficient printed circuit layout with so many interconnections on the circuit board. Much of the complexity is because it requires parallel bus pins on each IC to accommodate all of these interconnections. In this example, the communication between each block in the circuit does not need high speed communication in real time, and the two wire I2C bus offered an opportunity of providing all of the data communication with only the two bus wires (the SCL clock, and SDA data lines) which make up the common bus connected in common to each I2C enabled integrated circuit in the system.

Also evident in this example, is that much of the communication does not need to be fully bi-directional. It does not need the multi-master or clock pulse stretching capability defined by the full I2C bus specification. Thus a design may be needed for a meter to drive a remote display. The increased distance to the display increases the capacitance of the connecting wires, and to meet the I2C loading limit, it is appropriate to use bus buffers to enable the signal to be transmitted over the increased distance. But a display needs no reverse signal path, and could use a buffer which does not offer the full bi-directional capability.

A number of design suggestions have been made to overcome these problems of expanding and extending the application of the I2C Bus. Many simple circuits have been published seeking to provide this expanded capability. Most of these circuits have problems which may be associated with latching, be only conditionally stable, or present glitches. The usual limitation presented by such circuits is that they are unable to reverse their direction of signal flow when active, generating a glitch that can upset the bus I2C function. For example a circuit will latch if the receiving logic path goes low and transfers this input low to the output. If this low output is detected as being low and transmitted back along the return path, then this low signal returning to the input as a low will hold the input low, even when the original external low drive signal is removed. Thus the bus has 'latched' into this low state. To prevent latching, various circuit techniques have been suggested to break that loop, and yet to still fulfil the required function. Oscillation in such a loop then becomes another possible problem.

A more subtle problem arises because the I2C Bus protocol has been defined so that two or more ICs may transmit (that is pull the I2C bus low) at the same time. With all ICs connected to the bus monitoring the bus line voltage, including the two or more which have started transmitting. The two active ICs contend, or compete to obtain control of the bus. This is called bus contention. As soon as one of those transmitting ICs detects that the bus has remained LOW even when that IC is attempting to transmit a HIGH signal, then that IC will immediately stop transmitting. That is when it detects the LOW being transmitted by another IC, when it was attempting to send a HIGH it stops transmitting and waits to retry at a later opportunity when hopefully there will be no contention.

A problem with many prior art circuits claimed to be able to provide a suitable buffering action is a problem that arises during bus contention. The way these circuits operate is to buffer the contending signals in a manner that generates spurious signals. To demonstrate this, consider when one side of the buffer circuit is held low, and while that input side is still held low, another integrated circuit connected to the buffer output generates a low signal. When the original input drive is released, the action of the buffer should be able to detect the application of the low on the output side, and continue to hold the original input side bus low even when the input drive signal ceases. However in circuits of the prior art there is a delay between the time the active forward path switches off, and the time when the reverse path is activated. This results in the input pin briefly being pulled high during this delay while the buffer signal path reverses, thereby generating a glitch which can be falsely interpreted by the integrated circuits connected on the input side as a signal pulse. A test for correct behaviour in these circumstances is called a glitch test. Many prior art circuits fail this test, whereby the input goes high for the time needed for the buffer circuit to recognise that the signal path has reversed.

The problem arises during the sort of pulse sequence which might occur during bus arbitration when there is a signal contention. In this test when the input to the bus is pulled LOW, the output side of the buffer circuit follows and goes LOW. If the output is then held LOW by another IC pulling it LOW on the output side (it is already being held LOW at that time, being held LOW by the original input signal acting via the forward path through the buffer). Then when an external LOW is applied to the output side of the buffer it will be held LOW by both the input being LOW, and the output being held LOW by the external signal as well. If the input LOW is then released, and we observe the behaviour of the input pin voltage after it is released by watching the voltage on the input side, we should observe it remaining LOW because the output is still being held LOW. However in prior art buffer circuits the forward path from input to output is active until after the input LOW is released, and the reverse path only becomes active when the forward path is switched off. To prevent latching this active path has locked out the reverse path from the output back to the input side of the buffer. So when the input drive holding the input LOW is released, the input pin will initially go HIGH to turn off the forward signal path, and only after the time delay for this signal to propagate to the output, will the externally applied LOW on the output be detected, and the reverse path from output to input enabled, so that, after a further propagation delay, the input pin is pulled back LOW again to reflect the LOW at the output pin. This HIGH pulse which appears on the input pin when it is released, appears as an unwelcome glitch until the LOW signal from the output is propagated back to the input and able to pull it low. This glitch can present a HIGH signal to the ICs on the bus at a time when the bus should be held LOW without a glitch.

The I2C specification does allow glitches of less than a specified duration at non critical times. However a glitch on the SCL, or clock line may be interpreted as a clock pulse, and will generate a spurious signal at the receiver, something that cannot be tolerated.

In all of these examples the circuitry needed to avoid generating a glitch on reversal of the signal path adds to the complexity and also limits the maximum speed of the circuit. The added complexity adds significantly to its cost.

It is an object of this invention to provide a cost-effective solution to the problems of the prior art, or at least to offer the public a useful alternative.

It is an object of this invention to provide a simple circuit, preferably at a lower cost which includes the possible generation of a glitch at times where its presence would not cause a problem.

SUMMARY OF THE INVENTION

In one form of this invention although this may not necessarily be the only or indeed the broadest form of this there is proposed a bus buffer including a means by which a clock or timing signal may be buffered, and a second bi-directional buffer circuit which serves to buffer a data signal, the clock and data signal paths each including a first bi-directional signal path including circuitry adapted to generate a logic high level on said first signal path, one or more first stations connected to the first bi-directional signal path adapted to monitor a logic level on said first path, and to generate a logic low level on said first path;

an interface device operatively coupled to the first bi-directional signal path, said interface device having a first receive input also capable of functioning as an output capable of pulling the first path low;

a second bi-directional signal path including circuitry adapted to generate a logic high level on said second signal path;

one or more second stations connected to the second bi-directional signal path adapted to monitor the logic level on said second path, and to generate a logic low level on said second path;

the second bi-directional signal path being operatively connected to a second receive input also capable of functioning as an output capable of pulling the second path low;

the interface device further including in its clock control buffer a means adapted to ensure that the output voltage on its second clock signal path follows the input voltage on its first clock signal path; and on the data buffer side a means adapted to ensure that if the first data signal path is pulled low first then its second data signal path follows that first data signal path, or if the second data signal path is pulled low first then the first data signal path will follow that second data signal path.

In preference the buffer is implemented using a CMOS process.

In preference the buffer includes means to enable or disable the buffer such that when in the disabled state the buffer presents a low capacitance load on the busses on both sides of the buffer.

In preference both sides of the buffer are specified to be capable of driving a normal I2C or SMBus.

In preference there is a direction control input by which this path may be reversed under external control to allow the first clock signal path to follow the second clock signal path.

Preferably the latching is set and released when the bus voltage is 70% of a supply voltage.

Preferably the signal control path has hysteresis input voltage levels of 30% and 40% of VCC.

Preferably the buffer includes an enable function which when in a disabled condition ensures that the buffer presents a low capacitance load on the bus, and a low stand-by current.

Advantageously given the I2C specification in its entirety is not necessary in many applications the bus buffer of this invention is able to have the clock signal path (SCL), is not bi-directional, although the direction in which it buffers the clock signal may be selectable.

Still further the circuit is able to act as a buffer in a large number of applications using the I2C, the SMB Bus, or another bus system operating on similar principles. By limiting its operation, and not incorporating the capability to perform in all possible bus configurations, an integrated circuit can be made which exhibits enhanced performance at a significant reduction in circuit complexity and cost.

A further advantage of this arrangement is that the invention provides for a fully symmetric buffer, and in the case of the "data" buffer, the direction of signal transmission is simply determined by which ever signal path is pulled LOW first. So control of signal transmission direction is determined by the timing of the respective input signals, and has nothing to do with any special intermediate voltage levels as taught from the prior art, particularly U.S. Pat. No. 6,014,040.

As the person skilled in the art will appreciate certain voltage threshold levels must apply in order to determine the HIGH or LOW state of the inputs.

Preferably for this invention there is provided two threshold voltages.

Preferably a 70% Vcc level, when one or other input signal decreases below this voltage level, that signal is deemed to be the controlling signal, and it will set a "direction" latch which prevents any signal from the other input taking control.

Preferably 30%×Vcc level, the level at which the controlling input is seen as a logic LOW, which is then transmitted as a logic LOW to the output.

Nonetheless as the person skilled in the art will appreciate the actual values per se of the voltage thresholds are not important.

Advantageously this arrangement provides for a "clock" channel which is much simpler, and its direction is actually preset by means of "direction" control pin, and therefore doesn't require any special means for determining signal direction.

While U.S. Pat. No. 6,014,040 provides an (intermediate) analogue voltage to determine signal direction, for this invention (for the "data" line only) the signal direction is determined by which ever signal input is the first to see a logic LOW, which sets a digital latch blocking the reverse signal path.

Consequently signal direction is determined by the relative timing of the input signals and setting of a digital latch, and it is not the actual voltage of the input signals that is important.

Advantageously this invention places no constraints on the output LOW voltage level, and input LOW voltage threshold on the input/output side of the buffer.

For example in U.S. Pat. No. 6,014,040 as the output, 311 can never pull LOW below approx. 0.8V (ie one saturation voltage of transistor 318, plus the forward diode voltage of diode 319) which for low voltage logic systems (eg. <2V) may not meet bus specifications such as the I2C requirement of Vil below 30% of Vcc. With regard to inputs, the input 311 must be pulled below Vmed (approx. 0.6V) to be seen by comparator 314 as a logic LOW. This is a fixed voltage level and is independent of the supply voltage.

Advantageously the arrangement for this invention will always pull down to a true logic LOW voltage determined simply by the ON resistance (RDSon) of the output driver FET. This implies that are no restrictions on the output logic LOW voltages on either side of the buffer (and this applies to both clock and data channels. With regard to inputs, they only need to be pulled below 30% Vcc to be seen as a logic low. Hence the arrangement allows the relative positioning of several levels during operation.

If the signal path being pulled low changes while the buffer data circuit is active, then the buffer function is also reversed, generating a brief release of the data path which was initially low while the active signal path in the buffer is reversed; and the initial direction of transmission of the data signal being determined by which of the first or second signal path is pulled low first.

As introduced above U.S. Pat. No. 6,014,040 provides channels that are identical, (but not symmetrical) and can be interchanged without any affect on operation. A problem with such an arrangement is that as the buffers are not symmetrical, not all input/outputs are the same (with special intermediate voltage applying), and therefore there may restrictions on the type of interface circuits that can be connected to each side, therefore Inputs and outputs cannot necessarily be simply interchanged.

Advantageously however for this invention the channels are completely symmetrical (but not identical). The "data" channel is symmetrical, and bi-directional, and it is simply a matter of which input goes LOW first as to which side has control. By comparison the "clock" channel is intentionally uni-directional (to avoid contention) and the signal direction is determined by the state of the direction pin.

While the two channels of the buffer for this invention are not identical, both channels are in themselves symmetrical, and therefore their inputs and outputs can be interchanged with no affect on external circuits.

It may be advantageous for a buffer to function such that on one side the output drive capability is increased to be offer increased pull down current, and therefore be able of driving a greater capacitive load.

The data path is bi-directional and does not seek to suppress the glitch which arises in the event of the signal direction reversing while the bus is active low. The specification requires that the data signal is read at a time that the data is steady and nothing is allowed to be changing the level of the data line at the time the clock signal requires the data information to be read. In this invention any data signal reversal, and the glitch generated at this time, will not be occurring at the time of reading the signal level on the data line, and therefore such a glitch will not upset operation of the bus.

The proposed bus buffer that fulfils a large majority of the specified I2C function, accepting that the generation of a glitch in reversal of the data path while the buffer signal is low, will occur at a time at which the glitch can be tolerated and at the same time to limit the data flow in the clock line so that direction reversal of the clock cannot occur, and no glitch can occur in the clock signal.

In accepting the major problem addressed by the prior art which increased circuit complexity and slowed its response time, the present invention offers cost and speed advantages, while accepting the limitation of not having a fully bi-directional clock line.

The proposed buffer offers true buffer action, with no voltage offset between input or output, and without multiple input thresholds depending on the direction of data flow. This will replicate the data levels on the buffered side allowing buffers to be series connected without a voltage shifting penalty. A further advantage is to allow the capacitive loads on each side of the buffer to approach the maximum capacitance of a single unbuffered bus. With use of the enable function, sections of the bus can continue to be isolated, and have the time of their being made active controlled.

The invention has the advantage of being able to extend the bus load limit in a group of applications which are able to accept the simplification which is offered by this invention. By buffering both the SCL and SDA (clock and data) lines, it will allow capacitive loads of up to the speed limiting maximum (400 pF for 100 kHz maximum operation) on both sides of the buffer. With the use of an enable function, sections of the bus can be isolated, and then, through the use of a number of these buffers, different parts of the system are able to be isolated, and brought on-line successively or in a controlled manner, permitting a controlled start-up, and operation at maximum performance speeds while still having a diverse range of components, operating speeds and loads.

In this invention, the SDA line is buffered by a bidirectional circuit which detects the direction of the signal from the first side of the buffer to be pulled low. This then locks the direction of the buffer to provide an output low in response to that first low input signal.

The invention is able to be used in systems with removable components on a back-plane (for example in a telecommunications rack) where by using the features offered by the enable pin, and the high impedance of the input and output on power-down, a card can be safely installed or removed while in the disabled state, and once installed, enabled when the power supply and its operation has stabilized.

As has already been described, it is a major challenge to design a circuit in which a reversal of the bus direction while in the low state does not generate a glitch. However in the I2C or other systems, the SDA bus is read when there is a transition on the SCL (clock) line, and a glitch can be tolerated on the SDA line if it is not present at the time the bus is read. To design a buffer in which the glitch is reduced to be negligible adds considerable complexity, with the added complexity preventing operation at as high a speed as might otherwise be achievable.

Where the presence of a glitch might create difficulties and could be misinterpreted as an additional clock signal, this invention employs a buffer operating only in a single direction, with the possibility of reversing that direction with an external control.

After many years of experience in designing buffers that have offered applications that are compliant with the I2C specification, this invention seeks to forego a part of the range of possible applications offered by the specification, and in that way make a very useful buffer for use in the remaining areas of application.

The generation of a glitch under the glitch test conditions on the SDA line occurs at the end of the original input signal pulse, when the input side is released, and the output side of the buffer continues to be held low during the time when the input LOW signal is released. This will generate a glitch on the input side at the time of the release on that side, with its signal reverting to a LOW state after the glitch when the backward path through the buffer is enabled, and the LOW on the output is transmitted to the input. As the controller is aware that this is at the time when the data line is being switched, its signal level is not being read at this time.

Fortunately this means that the SDA buffer can be bi-directional, even though it generates a glitch.

The same freedom from constraint does not apply to the CLK bus line. It is at the time of the clock transition that the data is read, and therefore a glitch cannot be tolerated at this time. In the previous designs the need to create a buffer circuit which did not generate a significant glitch meant that the integrated circuit contained two identical buffers which could be used interchangeably for clock or data signals (although the pins were labelled SCL or SDA, these could be exchanged as each buffer circuit was the same).

Therefore in this invention our solution to the glitch problem on the CLK line is to make the CLK unidirectional, and to forego the luxury of full bi-directional operation, which makes a glitch free buffer design so difficult.

By doing this the lack of bi-directional capability on the CLK line prevents the use of pulse stretching by the slave device on the output side of the bus. Where a slave device on the output side of the buffer is unable to operate as quickly as the master, which up to this time has been generating the clock signal, clock stretching allows the slave to take over by pulling the CLK line low on the other side of the buffer in order to stretch the clock pulse to a pulse length more appropriate to its required speed of operation. It is therefore a limitation on the application of a buffer as described in this invention that applications using clock stretching are unable to use this buffer. However it should be able to be used in applications not needing pulse stretching. As slave devices needing clock stretching can be identified, these clock stretching stations may be able to be managed by arranging for the master and slave devices needing pulse stretching to be on the same side of the buffer. Thus the constraint presented by being unable to use this feature can also be avoided by including the integrated circuits requiring this feature in a section of the system that does not include a buffer between these integrated circuits and the controlling master.

A further refinement of the invention is to include a direction pin to allow the CLK buffer function to be reversed between input and output side under electronic control, so that it can function in the reverse direction while the enable pin is activated under program control.

As there is no voltage difference between an input and an output low, there is no loss of signal margins if these buffers are used in series. As with previous buffer designs, it is possible to include an enable function to isolate sections of the system under the command of the system controller. In this way the buffer can be used with a staged start up sequence, or can allow a section of the system to be disabled before it is unplugged.

Also the pin count permits the use of the commonly used eight pin package, with the two power supply pins, the SCL and SDA input and output pins (this time without identical buffer circuits being used for the SCL and SDA function, and a direction and enable pin.

Other objects and advantages of the present invention will become apparent from the following description, taken in connection with the accompanying drawings, wherein, by the way of illustration and example, an embodiment of the present invention is disclosed.

BRIEF DESCRIPTION OF THE DRAWINGS

The invention will be explained in further detail by way of example and explanation with some of the different possibilities in its application and its design being described with reference to the accompanying drawings wherein.

THE BEST MODE FOR CARRYING OUT THE INVENTION

Figure 1:
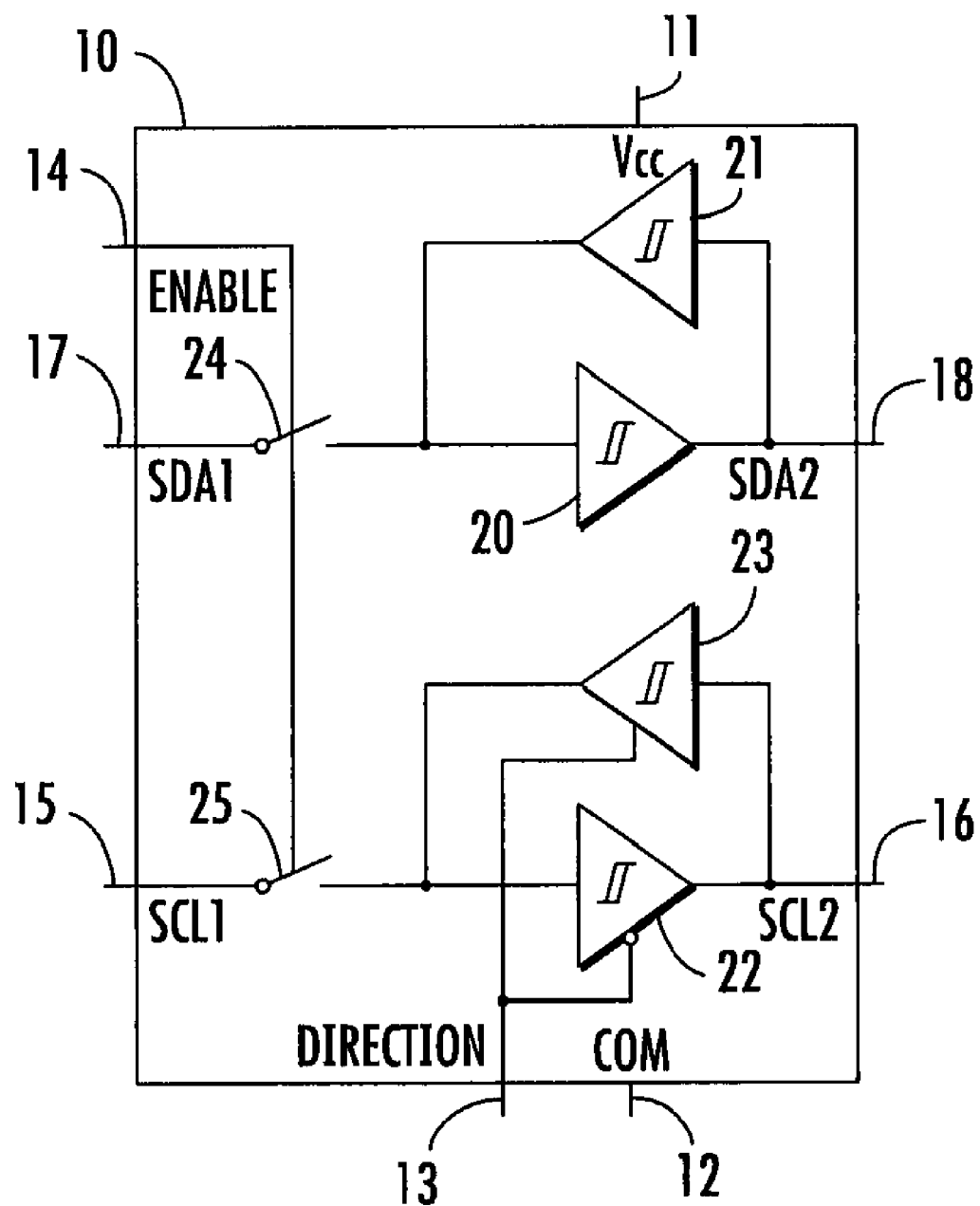
FIG. 1 shows a block diagram of a bus buffer according to the invention.

The basic structure of the buffer is shown in FIG. 1. The two buffer circuits comprising the upper data buffer are symmetrical, with an output signal that follows the input voltage offering bi-directional buffer action. The lower clock buffer is active in either the forward, or reverse direction, with the signal path direction controlled by a direction input. It also has an enable function applied to both sections of the buffer. That is to the forward or reverse path for the SCL clock signal and to the bi-directional SDA data path contained in the buffer IC.

The integrated circuit 10 in this example, has 8 connecting pins. There is the positive supply 11 (V$_{CC}$), the common negative power supply connection 12 (COM or V$_{EE}$), the direction control pin 13 (Direction) and the enable control pin 14 (Enable), and the inputs and outputs of the two buffer sections.

The inputs to the buffer are all schmitt inputs to enable it to be used with slowly changing input signals. A result of this greatly simplified approach to the buffer design means that once the falling input bus voltage reaches the input threshold, then the output is pulled LOW, without any need for the output to follow the input voltage with a constraining relationship between the two. The input and outputs 15 (SCL1) and 16 (SCL2) are for the clock path in the buffer. Only one buffer section shown here is active depending on which is selected by the direction input. The other input and outputs 17 (SDA1) and 18 (SDA2) are the bi-directional data signal path in the IC (the B buffer).

The forward data buffer 20 is connected in one direction, while the reverse path buffer 21 is connected in parallel, acting in the opposite direction. To prevent latching there is a latching circuit the detects which of the connections 17 or 18, reaches the threshold for a falling input signal first, enabling the buffer path in the direction of that first signal, and at the same time locks out the other path until that input LOW is released. The part of the circuit in this example is symmetrical, and its input and output can be interchanged without making any difference in function and performance, although there may also be good reasons to design a similar buffer with non-symmetrical characteristics (such as the output side having a greater current drive capability). For convenience the input has been called side 1 (SDA1) and the output side 2 (SDA2) of this part of the buffer.

The other signal path in the buffer from 15 to 16 is the clock signal path, SCL, has one buffer circuit 22 active while the direction input 13 is not activated. The reverse path buffer 23 is locked out. When the direction pin 13 is activated, the forward buffer 22 is switched off, and the backward buffer 23 is made active. As only one signal path can be active at a given time, the SCL signal on the input side is buffered and reproduced at the output without any need for latching or active direction control during a clock pulse train.

Figure 2:
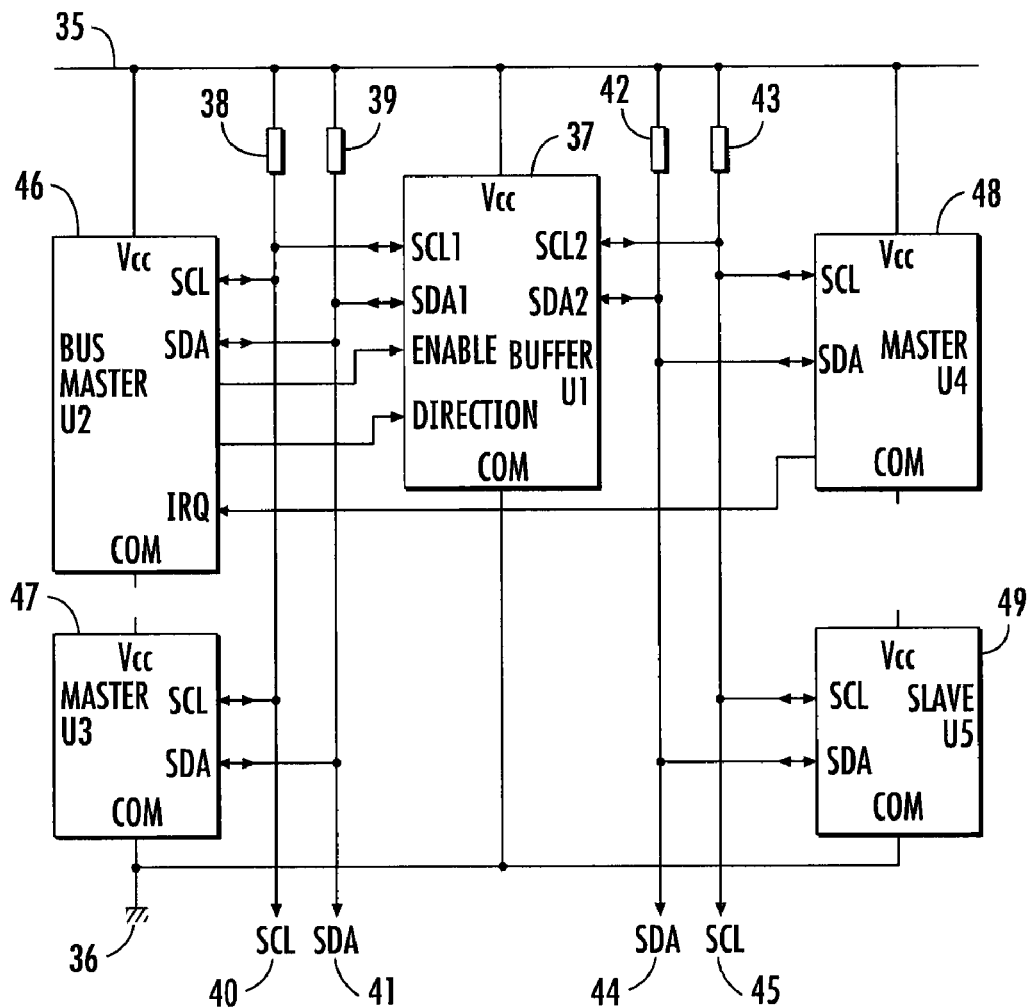
FIG. 2 shows an example of an application circuit in which I2C circuits are connected on both sides of the buffer of FIG. 1.

FIG. 2 shows a typical application for the buffer IC demonstrating its use. It can be employed to interface and enable communication between controllers in different parts of the equipment. There are master controllers on the first bi-directional signal paths (clock and data), with second bi-directional signal paths that can be isolated using the enable pin. A master on the second bi-directional signal path on the buffered side of the bus can only act as master if it informs the bus master via an interrupt request, and the bus master uses the direction input in the buffer to enable the reverse clock SCL signal path.

The buffer 37 is connected between the supply rails VCC, 35, and Ground COM, 36. The first bi-directional signal path consists of the I2C bus clock SCL line 40 and data SDA line 41, pulled high by the resistors 38 and 39 as required for I2C applications. The maximum total capacitive loading of each of SCL and SDA on this bus sets the maximum clock speed at which it can be used, for example 400 pF allows operation at 100 kHz.

It shows a bus master controllers 46 and a second master 47 on this first bi-directional signal path 40 and 41.

On the other side of the buffer the second bi-directional data path continues the buffered clock line SCL 45 and buffered data line SDA 44 to other I2C stations. These have pull up resistors 42 and 43.

The second bi-directional signal path 44 and 45, can be isolated using the enable pin. A master 48 is also shown connected to the second bi-directional signal path on the buffered side of the bus. It can only act as the master generating the clock signal if it informs the bus master via an interrupt request, and the bus master uses the direction input in the buffer 37 to enable the reverse clock SCL signal path.

Also shown on the second bi-directional signal path is a slave station 49 which can be controlled either from a master on the first bi-directional signal path, or from the master 48 which is also connected to this path and can take control of the bus when the direction input to the buffer 37 is active.

As the buffer 37 totally buffers the signal between the first and second of the bi-directional signal paths, each of these signal paths can be capacitively loaded independently without the total sum of bus capacitance on the two sides of the buffer becoming the limiting factor on bus speed. As each I2C station connected to the bus presents a further capacitive bus load, the number of I2C stations that can be connected and driven at any time is limited. Use of the buffer extends this drive capability by allowing an increased total capacitive load.

Many different configurations are possible by extending the concepts shown in this circuit.

For example, a number of buffers can be connected on the one I2C bus, with the bus master having control of each buffer via its controlling enable input. This will permit a slower slave to be isolated, and only actively connected to the bus when needed. At other times then the clock can run at the typical speed of the other I2C stations connected to the bus. Other examples of applications include using it to isolate the bus drive to an OM1715. By connecting it before the OM1715, the higher current output drive capability of the OM1715 can be used where the distance involves the need to drive a line capacitance up to 10 times greater. If signal propagation delays in this extended path become the limiting factor for the maximum bus speed possible, the enable pin can isolate that slow part of the buffered system when that section is not being addressed.

In this way, combined with other special function I2C devices, it offers greater flexibility in application, for example, by using the enable inputs under individual control from the master to isolate different sections of the bus. This can be in an application which combines the use of the buffer with a bus multiplexer, or I2C input/output expander.

Figure 3:
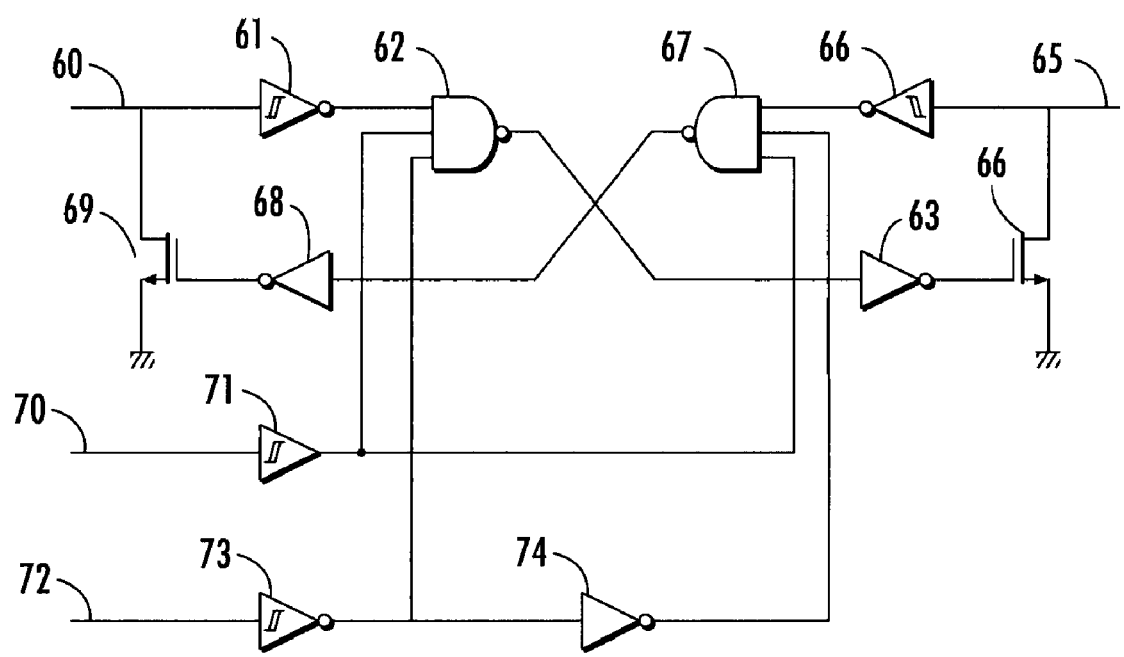
FIG. 3 shows a circuit for the buffering of the clock SCL signal. This can be disabled by the enable control, and the direction in which it buffers the signal is controlled by the direction control.

In FIG. 3 the circuit of the clock CLK section of the buffer is shown. As the active signal path is only in one direction at a time in this circuit, the complexity of the buffer circuit is greatly simplified. The input to the buffer 60 on the first bi-directional clock signal path is inverted by the schmitt buffer 61, and is high when the input is low. This ensures a stable output even with a slowly varying input voltage level. This is applied to the three input NAND gate 62. The other two inputs are from the enable input 70, and the inverted direction input signal 72. These are both high when enable is high, and the direction signal is low.

When all three inputs of the NAND gate 62 are high, its output to inverter 63 is low, providing a high drive to the open drain pull down FET transistor 64. This transistor pulls down the second bi-directional clock output bus 65, providing a low on this second bidirectional clock signal path.

Looking at the reverse path through the buffer, schmitt inverter 66 provides an inverted drive from the second bi-directional clock signal path to the three input NAND gate 67. However, if the direction input is providing a high on the other NAND gate 62, the inverter 74 has put a low on the direction input to gate 67. Thus the gate 67 will have a high output at all times unless the direction input signal is changed. This high output into inverter 68, provides a low on the gate of FET transistor 69, holding it off.

If the enable input 70 is taken low, its schmitt buffer 71 provides a low on both the NAND gates 62 and 67, and locks out the clock CLK path through the buffer altogether.

When the direction input 72 is taken high, its signal is inverted in the schmitt inverter 73, presenting a low on its input pin to the NAND gate 62, locking out the forward path through the buffer. The output of the schmitt inverter 73 is further inverted in gate 74, putting a high on the direction input to NAND gate 67. Now, if enable is active, the buffer will transfer a low signal through the backward path through the buffer from the second bi-directional clock signal path 65 back to the first bi-directional clock signal path 60.

Figure 4:
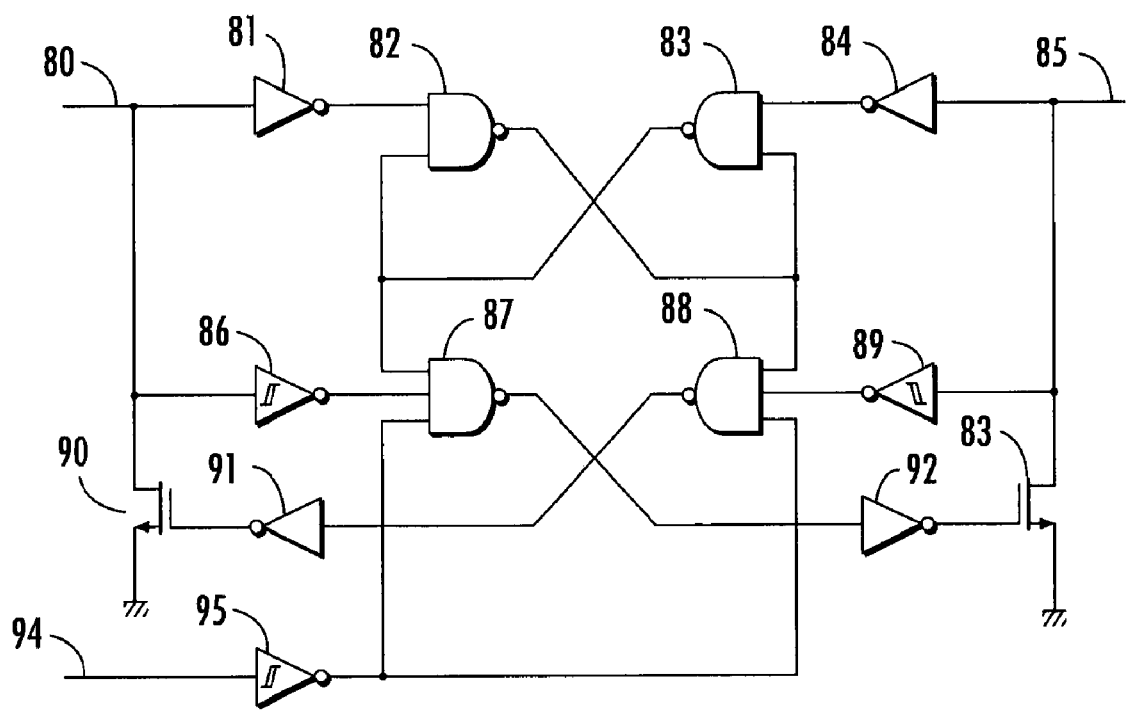
FIG. 4 shows a circuit providing the desired bi-directional buffer action for the data SDA signal.

The circuit shown in FIG. 4 is an example of a circuit which provides the data SDA signal buffering. This part of the buffer circuit is symmetrical, with the same circuit viewed from the first bi-directional data signal path 80 through the buffer to the second bi-directional data signal path 85, as for the reverse signal direction from the second bi-directional data signal path 85 back to the first bi-directional data signal path 80.

The important difference from the clock part of the buffer shown in FIG. 3 is the inclusion of a latch made up of gates 82 and 83 instead of having an externally controlled direction input.

If the voltage on the first bi-directional data signal path 80 falls to the threshold voltage of the inverter gate 81, the output of the inverter 81 will go high. If this happens before a falling signal on the second bi-directional data signal path 85 driving inverter 84 reaches its threshold and its output goes high then the latch made up of cross-coupled gates 82 and 83 will latch with the output of gate 82 going low, and locking out the high from the output of inverter 84 until the output of inverter 81 goes low again. That is the latch is set until the input on the first bi-directional data bus 80 goes high enough to exceed the input threshold of inverter 81.

We have assumed that the signal on the first bi-directional data signal path 80 has fallen to the threshold of the inverter gate 81 first, and that means that at that time the input from the second bi-directional data signal path 85 is high, and at that time the output of inverter 84 is low driving an input of NAND gate 83, forcing the output of NAND gate 83 to be high. Thus both inputs of NAND gate 82 will become high. That satisfies the AND function of gate 82, resulting in a low output from NAND gate 82 which when applied to the second input of NAND gate 83 latches this cross-coupled pair of NAND gates 82 and 83 into this configuration even though the input from the second bi-directional signal path will be pulled low by the operation of the buffer a short time later by the action of the circuit in transferring the low on the first bi-directional data signal path through to the output of the buffer on the second bi-directional data signal path.

The cross coupled latch of NAND gates 82 and 83 remain latched until the signal pulling the first bi-directional data signal path low is released, and when that signal is pulled high and reaches the threshold of the inverter 81, the output of the inverter goes low, and forces a high on the output of NAND gate 82. At that time the cross-coupled latch made up of gates 82 and 83 is not latched, although if the output of inverter is still high because the second bi-directional data signal path is still being held low, this will immediately set the latch in the backward direction. When both bi-directional data buses are high, the latch is not set, with the outputs of NAND gates 82 and 83 both high, and with the latch waiting for either of the controlling inputs to go high to set the latch in either the forward or backward direction.

Latching the cross-coupled NAND gates 82 and 83 in the forward direction applies a low signal on one input of NAND gate 88, forcing the output of this gate high, and preventing any signal being transmitted in the reverse direction to drive transistor 90. With the output of NAND gate 88 high, the output of inverter 91 is low, and the FET transistor 90 is held off. At the same time the corresponding input of NAND gate 87 is taken high, and this allows the transmission of the input low from the first bi-directional data signal path 80 through schmitt inverter 86, via NAND gate 87 to inverter 92 turning on transistor 83, and pulling the second bi-directional data signal path low. Thus the low on the first bi-directional data signal path which appeared first on the input 80, is transmitted through to pull the second bi-directional data signal path low.

Note that because gate 81 is driving a latch, there is no need for it to have a schmitt hysteresis capability as it can already latch even with a slowly varying input signal. However, as with the circuit shown in FIG. 3, the gate input uses a schmitt inverter 86 to avoid multiple pulsing on a slowly falling input signal.

The enable input 94 operates in the same way as the enable input on FIG. 3, and if it is taken low, the schmitt buffer 95 takes one input of each of the NAND gates 87 and 88 low, and locks out the buffer until the enable signal becomes high again.

The threshold voltages at which the input inverters are activated are designed so that the first gate to switch on a falling input signal is one of the inverters 81 and 84. Typically it will switch at 70% of the supply voltage VCC.

As the voltage falls further the latch is already latched when the input to the schmitt inverter 86 reaches its threshold, typically designed to act on a falling input signal at 30% of the supply voltage VCC. As the low signal is released and the first bi-directional data signal path is pulled high by its pull up resistor, with a time constant determined by the bus capacitance of this first bi-directional signal path the schmitt inverter will typically switch at 40% of the supply rail, and acting through the NAND gate 87 and inverter 92 release the second bi-directional data signal path held low by transistor 83, if no station on that second bi-directional data signal path has acted to hold the path low.

When the rising voltage on the first bi-directional data signal path reaches the threshold of inverter 81, the output of the inverter goes low and releases the latch.

If the second bi-directional data signal path is not being held low by another station, it also rises when transistor 83 is turned off, and both buses go high.

However if the second bi-directional signal path is being held low by another I2C station connected to that path, then its voltage remains low, and the output of inverter 84 is high. This acts to latch the cross-coupled NAND gates 82 and 83 in its other state, activating the reverse or backward path through the buffer. That is that a low voltage on schmitt inverter 89, applies a high to 3 input NAND gate 88, and as its other two inputs are also high, its low output drive inverter 91 will turn on transistor 90, pulling the first bi-directional data signal path low again.

What will therefore be observed on the first bi-directional signal path which was being held low, is that because the buffer was first latched in the forward direction to only drive the output transistor 83 on, when that input signal on the first bi-directional signal path is released, the bus voltage will rise with a time constant set by the product of the pull-up resistor value and the capacitance of that first bi-directional data signal path. The output driving the transistor 83 on the other side is released when it reaches the typical 40% of VCC level, but this is irrelevant, because in this example there is a station on that output 85, that is, the second bi-directional data signal bus already holding it low, so that the second bi-directional data signal path voltage will not be free to rise.

However the voltage on input 80 connected to the first bi-directional data signal path will continue to rise until it reaches the typical 70% of VCC level. At that time, the latch made up of NAND gates 82 and 83 is free to latch in the reverse direction, and the reverse path in the buffer will act to switch on transistor 90, and pull the first bi-directional data signal path back down. This voltage rising to the 70% threshold, and then being quickly pulled low again is the glitch generated by need for the signal direction to be unable to reverse through the buffer circuit until the input voltage on the first bi-directional signal path has reached the threshold level of inverter gate 81, allowing the latch to switch into the backward state, and thereby pulling the first bi-directional data signal path low again. However as the reversal of direction must occur at a time when the data signal is being switched, this glitch will not upset the operation of the I2C signalling system, The data is only read at a time when the clock signal is timed to guarantee that the data level is stable, and as the glitch is generated when a data voltage transition is occurring under the control of the current I2C master, it should not be at a critical instant in time when the data value is being read.

Figure 5:
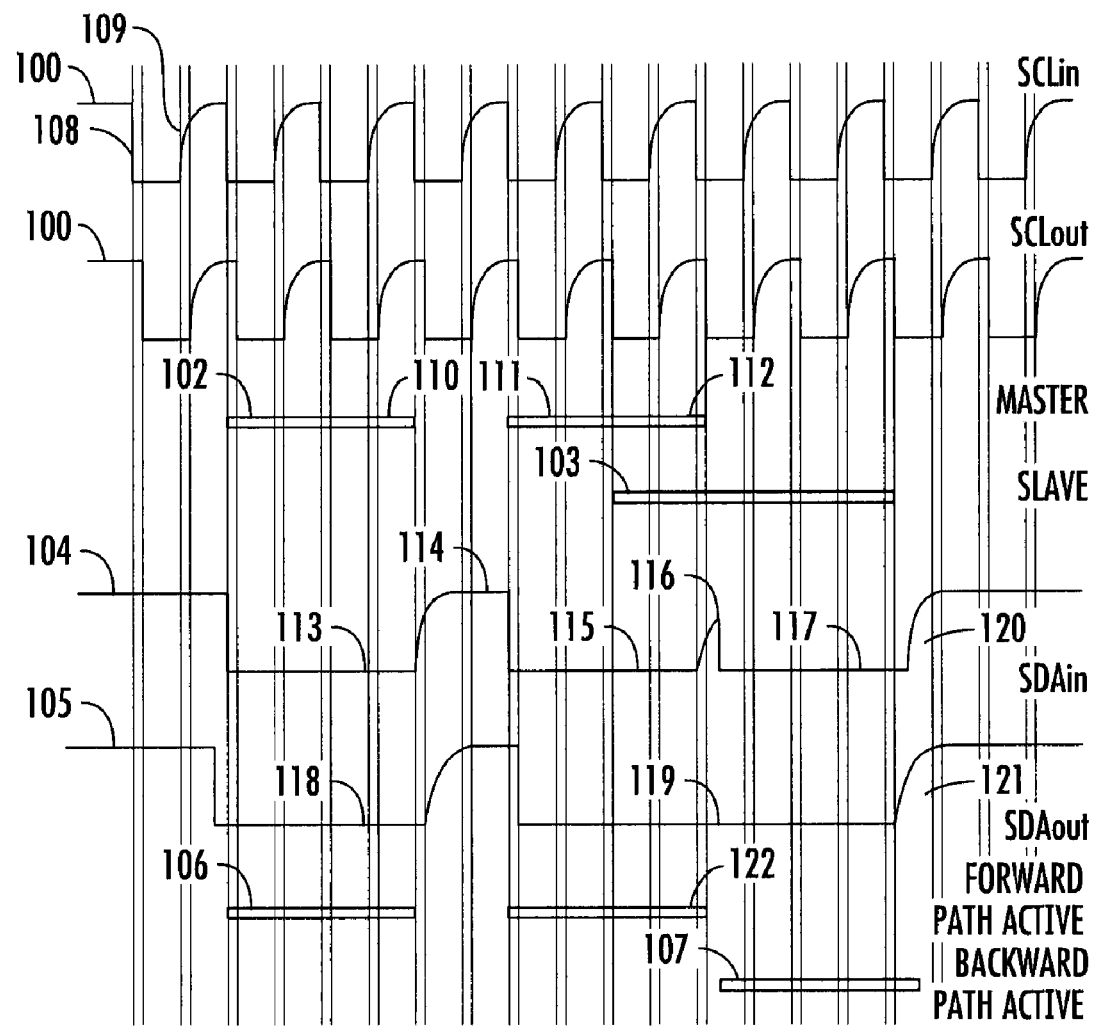
FIG. 5 shows an example of the typical waveforms seen on each side of the buffer, and in particular shows the glitch generated when the direction of the signal path changes.

The waveforms shown in FIG. 5 illustrate the operation of the buffer in practice.

The first waveform 100 shows a series of clock pulses emanating from the bus master controller on the input side of the buffer. That is on the first bi-directional clock signal path. The voltage level is normally pulled high by the pull up resistor connected to this first bi-directional clock signal part of the bus. When the master generates an active low signal, the voltage on the bus is pulled low quickly at 108 and subsequent falling edges because the pull-down capability of the bus driver output of the master is significantly greater than the current in the pull-up resistor with the bus pulled low.

At the end of the low period of the clock drive signal, the master releases the bus, and the bus is pulled high (109 and subsequent typical rising waveforms) towards the supply voltage VCC by the pull-up resistor, the voltage with the time constant of the rising voltage set by the product of the capacitive load present on that section of the bus and the pull-up resistance.

The waveform 101 shows the output waveform of the buffer, that is on the second bi-directional clock signal path, showing the buffered clock waveform from the first waveform 100 delayed by a small propagation delay made up of the delay for the input of the buffer to detect that the input level has changed plus the gate delay of the internal buffer circuit.

The blocks 102 and 103 show the timing of the pull down signals applied to the data inputs or outputs. The blocks 102 show when the master is applying a low signal to its data in side of the buffer, that is to the first bidirectional date signal path, and 103 shows when a slave on the other side of the buffer, that is the second bi-directional data signal path, is holding that part of the bus low. In this example for the first time the master alone is holding the bus low during period 110, the second part of the master signal 102 differs in that when the master is holding the data bus low this second time 111, the slave also becomes active 103 and attempts to pull the already low bus down during the same time that the master is still active low in 102. If the master is then released at time 112 while the slave continues to hold the bus low, then signal reversal will occur in the buffer data path, and a glitch will be seen on the master, that is the input side of the bus. This shows graphically what has been described previously as the glitch test.

Waveform 104 shows the waveform of the input side of the data bus (SDAin). That is the voltage waveform on the first bi-directional data signal path. In this waveform the input bus is first pulled low for the duration of the first block 110 of the master output holding the data bus low in 102. That is for the time 113. When the master releases the bus, the input bus goes high 114, until it is pulled low again 115 when the master is active during the second block 111 of the input block.

In the timing shown for both of these two blocks 102 it is evident that the master was active before any activity by any station on the output or slave side. The data section of the buffer is set so that the forward path is active for the duration of these active signals 102 because they went low first. So in both cases where the buffer is operating in the forward direction, the input side the data bus is low until the master releases the bus and allows the input voltage to rise towards its threshold. In the first part of this example when the input is low at time 113 of waveform 104, at the end of the low period 110, the signal will rise as the bus is released. The bus output also rises after a propagation delay as is shown in 105. The input signal rises to a high level 114 when it is released by the master.

It is different for the second low generated by the master. As the low 111 is applied to the input the buffer again latches in the forward direction. The bus is pulled low 115, and as the buffer is acting in the forward direction, the output will be pulled low in waveform 105 for the first part of period 119. However as is shown in 103, the slave on the output side is active, holding the output low when the input is released by the master at the end 112 of the second master signal 111. As the buffer is acting in the forward direction the input bus is free for its voltage to rise as the master is no longer holding it low. This rise is shown by the first part of the glitch 116 as an increasing voltage which is only seen on the input side.

This signal on the input side rises until it reaches the input threshold and allows the direction latch to be immediately switched into the backward direction, at which time the glitch pulses is completed by the input voltage returning to a low level, this time being held low by the low on the output side 103 being buffered in the backward direction and transmitted back to the input. Thus the output side of the buffer remains low throughout the time that either the input is held low 111, or overlapping with his signal, the output is held low by the slave 103 without exhibiting any glitch.

Thus there is a glitch 116 generated only on the input side during the time needed for the data buffer to switch its direction. Finally, after the glitch the input side is held low by the buffer 117 for the rest of the time the slave is holding its bus low 103.

The slave side waveform 105 follows the input, with the propagation delay while the buffer is operating in the forward direction, and is therefore low for the period 118 which corresponds to the input waveform section 113, it then follows the input buffer high, and returns to low 119, and remains low without a glitch for the full time first with the buffered input pulling the output low, then with the buffered input as well as the slave pulling the output low, and finally by the slave alone pulling the output low.

When the slave generated low ends, the input side is released 120 after a backward propagation delay starting from the time the slave acts to release the bus 121.

To clarify the state of the active direction of the buffer during this example waveform, 106 shows the time the forward path is active, and 107 shows when the backward path is active. In this example the buffer direction is switched 122 when the input low is released and the input bus voltage has risen sufficiently to release the direction latch, and latch it in the other direction because of the slave generated low on the output side.

Similar diagrams can be drawn showing the reversal of the buffer in the other direction. In this case the output slave driven side goes low first, and sets the buffer latch in the backward direction. Then if the master drives the input side of the buffer low while the output side is still being held low, there will be a glitch on the output side when the output slave drive is released.

As the signal data on the data bus is read when the clock low is released, it can be seen from these waveforms that at this point at the end of each clock low pulse, there has been sufficient time for the voltage on the bus to have fully settled after any switching transitions on the data bus. The presence of the glitch on signal path reversal must be considered, and sufficient time allowed in the total clock period to allow for the data bus to have settled by this time. This needs careful design consideration if two or more bus buffers are being used in series, as signal path reversal will only have been fully achieved when the change in direction has propagated through all of the series connected buffers. This propagation delay may limit the maximum operating clock frequency at which the buffer can be used.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A buffering circuit comprising:
   a first buffer circuit for a clock signal path for buffering a clock or timing signal and a second buffer circuit for a data signal path for buffering a data signal, wherein the clock and data signal paths each comprise a first bi-directional signal path providing circuitry adapted to generate a logic high level on said first bi-directional signal path and a second bi-directional signal path including circuitry adapted to generate a logic high level on said second signal bi-directional signal path;
   one or more first stations connected to at least one of the first bi-directional signal paths adapted to monitor a logic level on at least one of first bi-directional signal paths, and to generate a logic low level on at least one of the first bi-directional signal paths;
   a bus buffer operatively coupled to at least one of the first bi-directional signal paths, said bus buffer device having a first receive input also capable of functioning as an output capable of pulling at least one of the first bi-directional signal paths low;
   one or more second stations connected to at least one of the second bi-directional signal paths adapted to monitor the logic level on at least one of the second bi-directional signal paths, and to generate a logic low level on at least one of the second bi-directional signal paths, wherein at least one of the second bi-directional signal paths is operatively coupled to a second receive input of the bus buffer, wherein the second receive input is also capable of functioning as an output capable of pulling at least one of the second bi-directional signal paths low;
   the bus buffer further including in a clock control buffer a means adapted to ensure that an output voltage on the second bi-directional signal path of the clock signal path follows an input voltage on the first bi-directional signal path of the clock signal path; and
   the bus buffer further including in a data control buffer a means adapted to ensure that if the first bi-directional signal path of the data signal path is pulled low first then the second bi-directional signal path of the data signal path follows the first bi-directional signal path of the data signal path, or, if the second bi-directional signal path of the data signal path is pulled low first then the first bi-directional signal path of the data signal path will follow the second bi-directional signal path of the data signal path.

2. The buffering circuit of claim 1 further including means to enable or disable the bus buffer such that when in the disabled state the bus buffer presents a low capacitance load on the first and second buffer circuits.

3. The buffering circuit of claim 2 wherein the first and second buffer circuits are specified to be capable of driving a normal I2C or SMBus.

4. The buffering circuit of claim 3 wherein there is a direction control input by which this path may be reversed under external control to allow the first bi-directional signal path of the clock signal to follow the second bi-directional signal path of the clock signal.

5. The buffering circuit of claim 1 wherein latching is set and released when a bus voltage is 70% of a supply voltage.

6. The buffering circuit of claim 5 wherein the data signal path has hysteresis input voltage levels of 30% and 40% of VCC.

7. The buffering circuit of claim 6 implemented using a CMOS process.

* * * * *